United States Patent [19]
Handler

[11] Patent Number: 5,653,251
[45] Date of Patent: Aug. 5, 1997

[54] VACUUM ACTUATED SHEATH VALVE

[75] Inventor: Michael D. Handler, Brookfield, Conn.

[73] Assignee: Reseal International Limited Partnership, New York, N.Y.

[21] Appl. No.: 398,771

[22] Filed: Mar. 6, 1995

[51] Int. Cl.[6] .................................. G05D 11/03
[52] U.S. Cl. .................. 137/114; 137/510; 137/895; 137/907
[58] Field of Search ........................... 137/111, 114, 137/510, 895, 907; 251/61.1

[56] References Cited

U.S. PATENT DOCUMENTS

| | | | |
|---|---|---|---|
| 1,109,682 | 9/1914 | Kassander | 137/895 X |
| 1,908,357 | 5/1933 | Hornbruch | 137/114 X |
| 4,852,851 | 8/1989 | Webster | 251/61.1 |
| 5,076,322 | 12/1991 | Choksi | 137/907 |

FOREIGN PATENT DOCUMENTS 55484  3/1989  Japan ........................... 137/907

*Primary Examiner*—Stephen M. Hepperle
*Attorney, Agent, or Firm*—Anderson Kill & Olick P.C.

[57] ABSTRACT

A linear sheath valve having a valve platform and a conforming cover. The valve platform can have inlet and outlet channels to carry liquid into and out of the valve. An elastomeric membrane is held under tension between the cover and the valve platform so as to control the flow of liquid between channels. The cover includes an expansion area on the cover surface adjacent to the membrane and between the inlet and outlet. Liquid flows through the valve when it is drawn by a vacuum. The vacuum operates on both the flow path exit, but also above the membrane, lifting it to open the flow path. Discontinuance of the vacuum allows the membrane to seal the inlet and outlet, thus again preventing any flow between them.

17 Claims, 4 Drawing Sheets

VACUUM ACTUATED SHEATH VALVE

FIELD OF THE INVENTION

This invention relates to sheath valves, i.e., valves which permit the flow of liquid in only one direction. In particular, it relates to a sheath valve which preferably uses a tensioned linear sheath, rather than a cylindrical sheath and to a sheath valve which is vacuum actuated.

BACKGROUND OF THE INVENTION

A sheath valve is a type of one-way valve which permits a liquid, gas, or other flowable material to be dispensed, but does not permit anything to pass backwards through the valve, and so prevents possible contamination to the contents remaining in the dispensing container.

One form of one-way valve is a cylindrical core encompassed by an elastic cylindrical sheath, with the core having an entrance tube therein leading to a portion of the sheath, and an exit tube leading from the sheath. The two tubes are closed by the sheath and do not interconnect; but pressure applied to the liquid being dispensed serves to expand the sheath so that the liquid can pass from the entrance tube to the exit tube. Upon release of the pressure, the sheath contracts, sealing the valve against any possible reverse contamination.

Various patents have issued directed to this cylindrical valve. Examples of these include Gerber U.S. Pat. No. 4,846,810; Debush U.S. Pat. Nos. 5,279,330; 5,305,783; and 5,305,786; and Pardes U.S. Pat. No. 5,092,855. Each of these uses a cylindrical sheath surrounding a cylindrical valve core. This cylindrical structure is not only difficult and costly to manufacture, but also difficult and costly to assemble. A problem with a cylindrical sheath valve is that, to maintain tension, the inside diameter of the cylindrical sheath should be smaller in diameter than the outside diameter of the core, resulting in difficult assembly.

My co-pending application, Ser. No. 08/327,608, filed Oct. 24, 1994 is incorporated herein by reference. It is directed to a linear (not a cylindrical) sheath valve structure which provides an effective one-way valve. The present application is directed to a sheath valve which is vacuum actuated and is preferably, but not necessarily, a linear valve. It, too, is a one-way valve.

BRIEF SUMMARY OF THE INVENTION

My one-way, vacuum actuated sheath valve uses inexpensive flat, elastic sheath material held in tension over a convex surface, that is, a surface which is wholly or partly curved or distended along at least one axis of a valve platform, which surface I refer to as a valve platform having a convex surface. There are entrance and exit channels and ports in the valve platform connecting with the interface between the sheath and the valve platform. It is important that the sheath be in tension over this surface, in order to provide a tight, one-way seal for the channels. The valve can control flow of various types of flowable products, such as liquids, pastes, and gases, referred to herein as "liquids."

The various embodiments include as elements (a) a valve platform with a convex surface; (b) a sheath which can be a flat elastic sheet prepared from roll stock, a preformed injection, or compression molded component; (c) a housing component or cover for sheath protection and retention, the cover and valve platform being sealed together; and (d) a source of vacuum, such as a vacuum pump or a Venturi aspirator.

These elements include:

First, is the surface of the valve platform that is the functional area in terms of barrier and closure, the sheath being in tension over the surface of the sheath where it interfaces with the valve platform. This platform can take a variety of shapes, ranging from a dome to a section of an elongated cylinder. The key consideration is the natural lay and stretch of the sheath when placed in tension, and its tight contact and interface with the valve platform.

Second, is the number and configuration of entrance and exit ports and channels that function to channel liquid flow within the context of the valve.

Third, are the mechanisms for anchoring the sheath to the platform. These anchor mechanisms can take various forms, but each uses a cover piece which sandwiches the edges of the sheath between the platform and the cover piece; and each provides for spacing between the cover piece and the platform in the area where the ports interface with the sheath, i.e., an expansion chamber, so that the sheath can expand under pressure to permit fluid flow between the ports.

Fourth, is a source of vacuum. It can be of any desired type, such as a vacuum pump or a Venturi. It is connected to the exit port and to a vacuum channel leading to the expansion chamber.

DETAILED DESCRIPTION OF THE INVENTION

Figure 1:
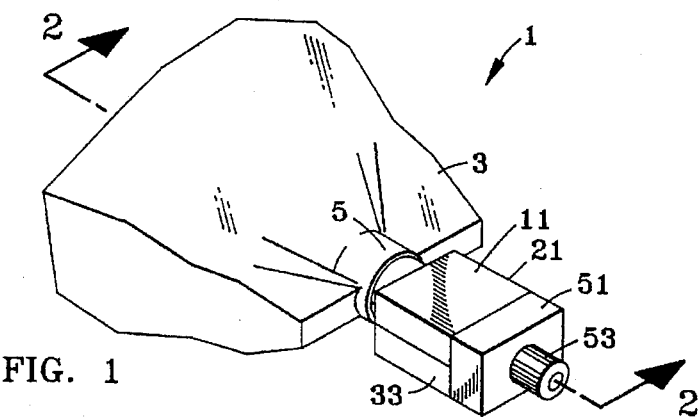
FIG. 1 is a perspective view of a dispenser of the type which might use the vacuum actuated sheath valve of this invention. The receiving container and source of vacuum are omitted from this view.
Figure 2:
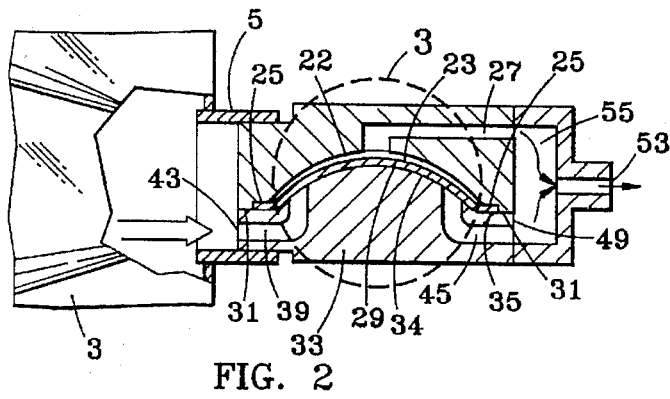
FIG. 2 is a partial section, taken on line 2—2 of FIG. 1, showing how the valve can be used in a dispenser.
Figure 3:
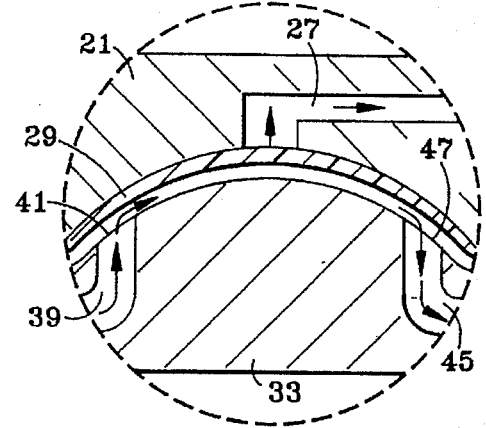
FIG. 3 is an enlarged view of the circled area 3 of FIG. 2, used to better show the operation of the valve. It differs from FIG. 2, however, in that in FIG. 3 vacuum has been applied and fluid or paste is being drawn through the valve.

A typical installation 1 of my one-way, vacuum actuated sheath valve is shown in FIG. 1 (a receiving container and a vacuum source are not shown). Collapsible container 3 contains the liquid or paste to be dispensed; and the user wants to be sure not to inadvertently contaminate the liquid or paste by back-flow into container 3. This use of a sheath valve prevents such back-flow, and acts as a one-way valve.

Figure 4:
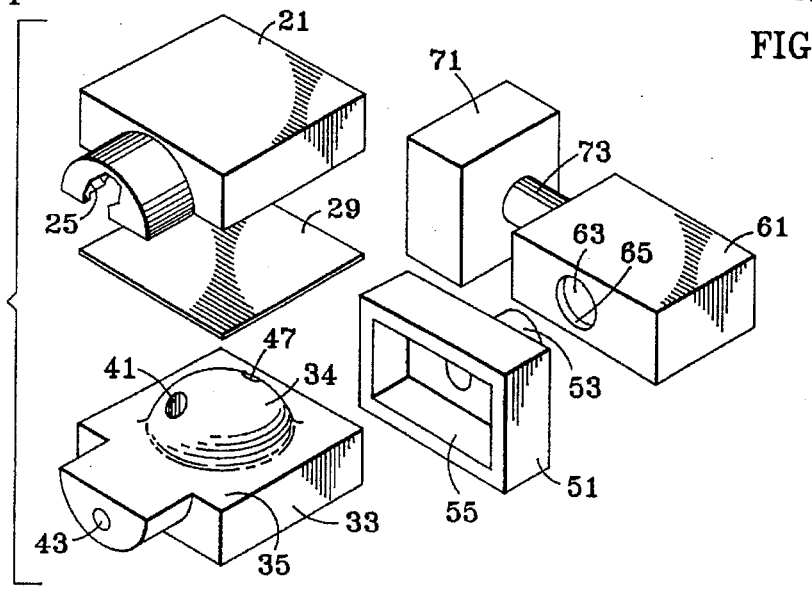
FIG. 4 is an exploded perspective view of the vacuum actuated sheath valve of my invention. A receiving container and a source of vacuum have been added to the sheath valve shown in FIG. 1.
Figure 5:
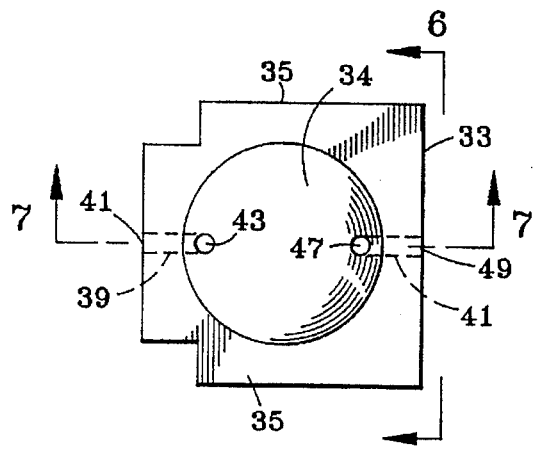
FIG. 5 is a top plan view of the valve platform shown in FIG. 4.
Figure 6:
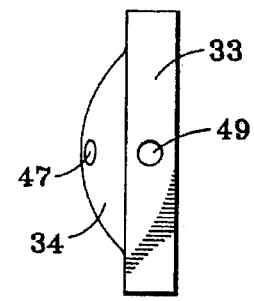
FIG. 6 is an elevation, taken on line 6—6 of FIG. 5.
Figure 7:
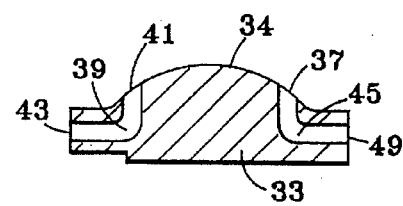
FIG. 7 is a section, taken on line 7—7 of FIG. 5, showing details of the construction.

My sheath valve 11 draws the liquid or paste from container 3; and the liquid or paste leaves the valve through exit 53. As shown in FIG. 4, it then enters a receiving chamber 61, which, in turn, is connected to an aspirator, a vacuum pump, or other source of vacuum 71.

Sheath valve 11 includes cover 21, valve platform 33, and exit manifold 51. The parts of sheath valve 11 are best seen in FIGS. 2 through 7. The valve described herein is a linear sheath valve, that is, its sheath (elastomeric membrane) 29 is not cylindrical, as set forth in the aforementioned patents, but is made of material which is either sheet material or essentially planar.

The parts of the sheath valve include:

(a) a cover 21 having a concave inner surface 22, which includes an expansion chamber 23 for the membrane 29, a peripheral cover shoulder (seal area) 25, and a vacuum channel 27 leading to the expansion chamber 23; the expansion chamber is preferably a slight recess in surface 22, but could, if desired, have a greater volume;

(b) a valve platform 33 having a convex inner surface 34, a peripheral seat 35 for cover shoulder 25, an inlet channel 39 (with sheath end 43 and container end 44), and outlet channel (vacuum channel) 45 (with sheath end 47 and user end 49); the surface can be spherical or cylindrical, but preferably should complement concave surface 22;

(c) an elastomeric membrane stretched over convex surface 34, sandwiched between cover 21 and valve platform 33, and sealed in place along the edges of the cover 21 and the valve platform 33 (expansion chamber 23 is formed between the upper surface of the membrane 29 and concave surface 22); and (d) manifold 51, with plenum chamber 55 connected to vacuum channel 27 and outlet channel 45. Manifold 51 is sealed, around the edge of the plenum, to cover 21 and valve platform 33, providing an air-tight seal around the interconnection of the manifold with channels 27 and 45.

As seen in FIG. 4, the outlet 53 from the manifold leads to the inlet 63 of a receiving chamber 61 for receiving the liquid or paste being delivered; and the inlet 63 is sealed at 65 to exit 53 with sealing ring 65. Chamber 61 is, in turn connected to vacuum pump, Venturi aspirator, or other source of vacuum 71 through sealed conduit 73. If the source of the vacuum is a Venturi aspirator, it can use flow or air, water, or other fluid to power the aspirator.

Normally, in the absence of vacuum, membrane 29 is held tautly against convex surface 34, thus sealing channel ends 41 and 47. Thus, no contaminants can pass backwardly through the channels 39 and 45 and enter flexible container 3. As shown in an earlier embodiment of my invention, however, pressure on the outside of container 3 can serve to force paste or liquid through inlet channel 39, forcing membrane 29 upwardly into expansion chamber 23, giving it a path to outlet channel 45.

In the present version of my invention, this is not done. Rather, a vacuum is applied to the outlet and draws the liquid or paste through the channel. Were the vacuum to be applied solely through outlet channel 45, however, it could not draw anything through the channel, for the vacuum would simply serve to draw the membrane 29 more tightly to the sheath end 47 of the channel sealing it more tightly. As a result, it is necessary to also apply the vacuum to the upper surface of the membrane by applying it to expansion chamber 23. This does not mean that the forces on the two sides of the membrane 29 would be the same, however, since the exposed area of membrane is different on the two sides. The lower side of the membrane has only the area of the outlet end 47, while the upper side has an area equal to the area of the upper surface that is within expansion chamber 23. Thus, there is a greater total upward force than total downward force; and the membrane lifts up, opening a channel underneath it which interconnects inlet channel 39 with outlet channel 45. (I call this difference in force "differential force"). The vacuum then acts through this channel to draw the liquid or paste from container 3, through inlet channel 39, over the convex surface 34, and out outlet channel 45 into the plenum chamber 55 in the manifold. Also, the upward pressure provided by the liquid or paste, once it begins flowing over surface 34, between channels 39 and 45, together with the upward (vacuum) pulling the membrane up from above, functions to keep the valve open, until the vacuum is no longer applied to the valve structure. When the vacuum ceases, the tension on the membrane serves to draw it again tightly against the convex surface 34, closing the valve. This prevents any contaminants from moving upstream and entering the container 3.

The paste or liquid drawn from the container 3 is drawn by the vacuum from the plenum through manifold exit 53 into receiving container 61.

As can be seen from the above, vacuum is applied from the source 71, through receiving chamber 61, and through the manifold plenum chamber 55, to be applied to the membrane through vacuum channel 27, in cover 21, and to outlet channel 45, in valve platform 33.

Figure 12:
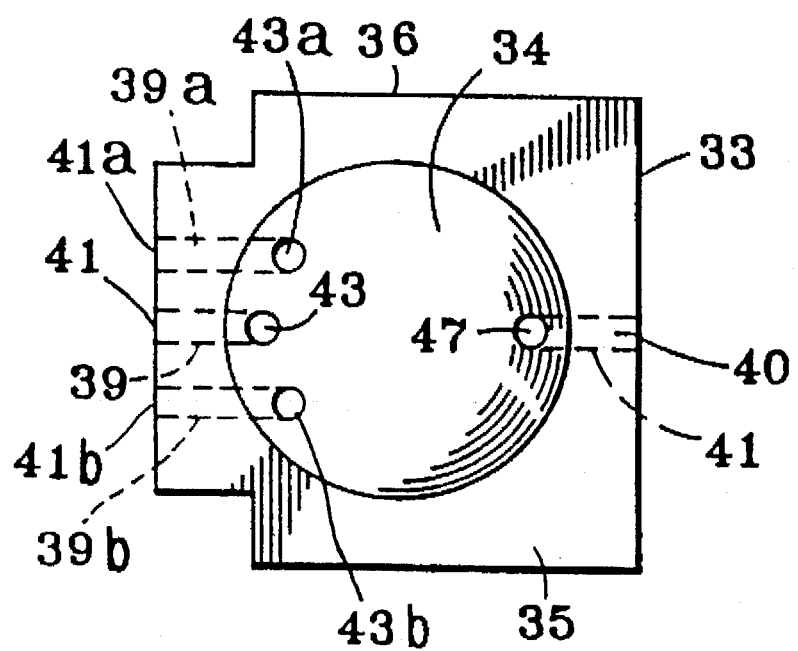
FIG. 12 is a plan view, similar to FIG. 5, showing a valve with a plurality of inlet channels.

FIG. 12 shows a modified valve with inlet channels 39, 39a, and 39b, with container ends 41, 41a, and 41b, respectively, and with sheath ends 43, 43a, and 43b, respectively.

Figure 8:
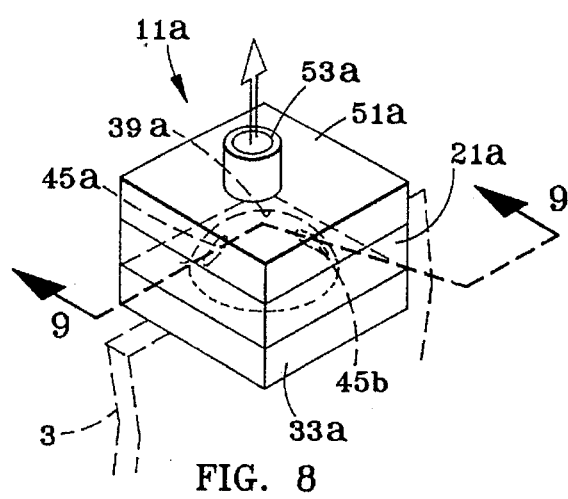
FIG. 8 is a perspective view, showing a modification of my vacuum actuated sheath valve.
Figure 9:
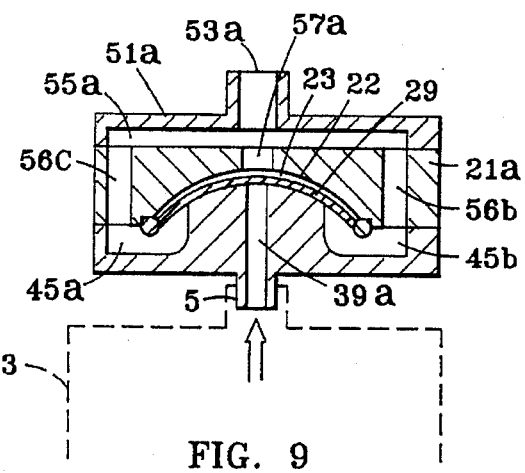
FIG. 9 is a section, taken on line 9—9 of FIG. 8.
Figure 10:
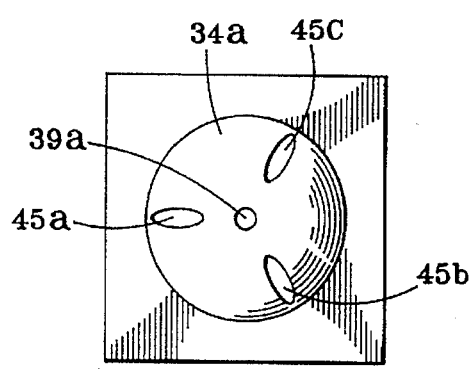
FIG. 10 is a plan view of the valve platform of the modification of FIG. 8.

A modification of my invention, still using differential force, is shown in FIGS. 8 through 10. In this instance, there are three channels in valve platform 33a, spaced 120 degrees apart. Channel 39a is an inlet channel, and channels 45a, 45b, and 45c are outlet channels. Each leads to convex inner surface 34a of valve platform 33a. Cover 21a has three outlet channels 56a, 56b, and 56b which connect, respectively, with channels 45a, 45b, and 45c. The manifold 51a is above cover 21a and sealed to it. It includes plenum 55a which connects the outlets of channels 56a and 56b with manifold exit 53a, leading to a source of vacuum. The plenum 55a is also connected to the expansion chamber 23, above membrane 29, by duct 57a.

The operation of this modification is similar to that earlier disclosed. Application of a vacuum to manifold exit 53a applies a vacuum to the top of the membrane 29 through duct 57a, and it also applies it to outlet channels 45a and 45b. Thus, differential force again occurs, the membrane is lifted, and the liquid or paste flows through inlet channel 39a, under the membrane, and out outlet channels 45a and 56a, 45b and 56b, and 45c and 56c, through plenum 56a and out manifold exit 53a.

Figure 11:
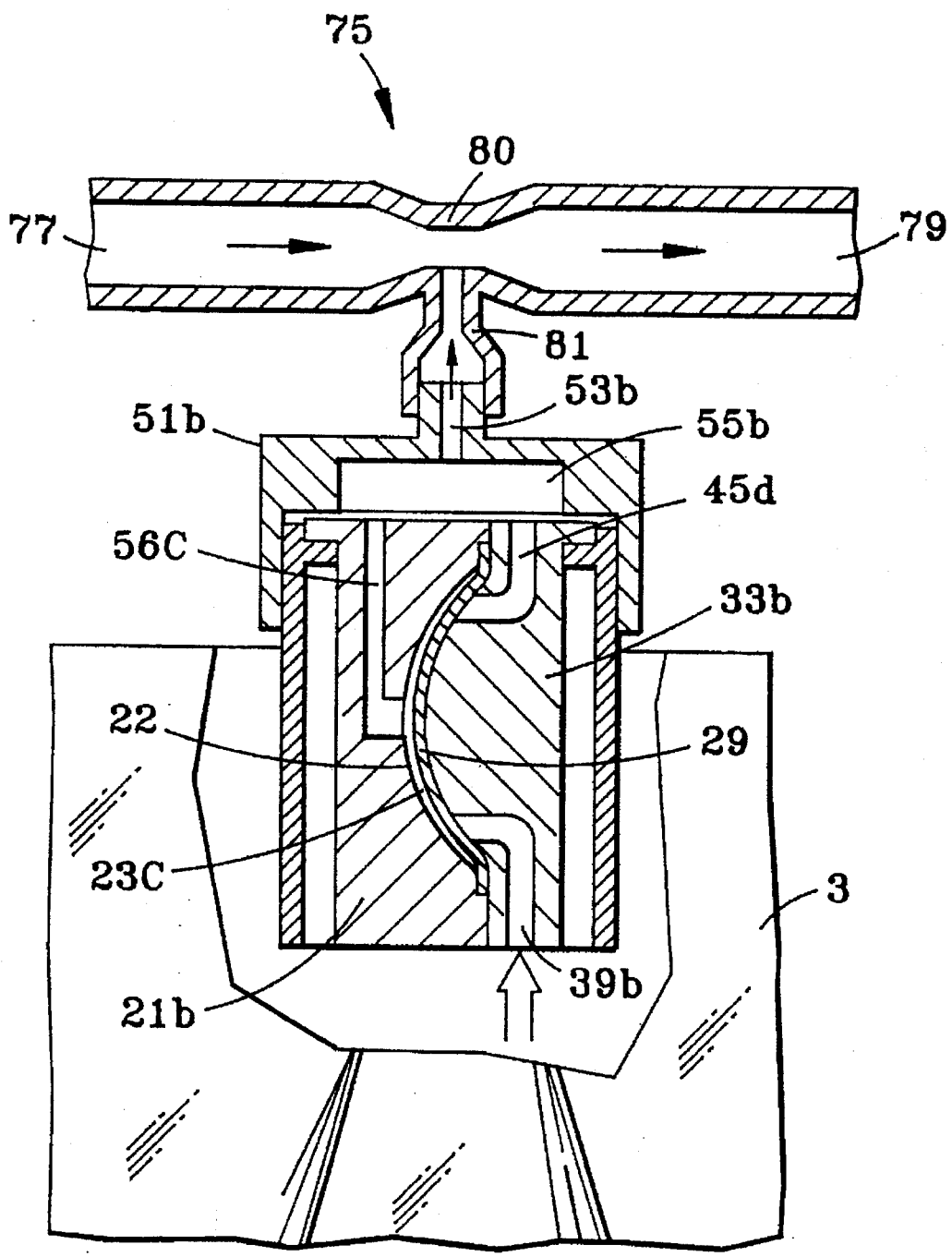
FIG. 11 is a partial section of the modification of FIG. 8, but including the dispensing container and a Venturi vacuum source. In this instance the liquid used in the Venturi to produce a vacuum is mixed with the received food, i.e., liquid/concentrate from the dispensing container. This modification could be used, for instance, to mix a concentrate of tea or juice with water, for dispensing at a soda fountain.

Another modification is shown in FIG. 11. Here, the vacuum source is an aspirator 75, and fluid runs through the aspirator from inlet 77 to outlet 79, through restriction 80, creating a Venturi and, so, a vacuum. Here, the object is to dispense a concentrate from container 3 and to have it mix with the fluid being used to create the vacuum to produce the desired end mixture. For example, concentrated tea or juice could be mixed with water at a soda fountain in order to produce a final mixed drink of predetermined proportions.

The unit of FIG. 11 works in a manner similar to that of FIGS. 1 to 7. The cover 21b includes a vacuum channel 56d leading between expansion chamber 23c and plenum 55b of manifold 51b. A membrane 29 is between the cover and the valve platform 33b; and the valve platform has an inlet channel 39b and an outlet channel 45c. Upon application of a vacuum, differential force is applied to membrane 29, and the liquid is drawn from container 3, is drawn under the membrane to plenum 55b, out manifold exit 53b and into aspirator inlet 81. There it is mixed with the water operating the aspirator and the mixture exits the unit through aspirator outlet 79.

If an aspirator is used as the source of vacuum, different fluids can be used to power it. If a liquid is used, it may mix with the paste or liquid being dispensed; if air or some other gas is used, the resulting effective mixture can be dispensed as an aerated stream or vaporized spray.

I claim:

1. A vacuum actuated sheath valve, said sheath valve including
    a valve platform, said valve platform having a convex surface,
    an inlet channel and an outlet channel in said valve platform, said channels leading to an inlet opening and an outlet opening, respectively, on said convex surface, said openings being spaced from one another,
    a cover for said convex surface of said valve platform, said cover having a concave surface complementary to said convex surface, said concave surface including an expansion chamber,
    an elastomeric membrane positioned between said valve platform and said cover, tension means for holding said elastomeric membrane under tension with said elastomeric membrane taut against said convex surface and over said inlet opening and said outlet opening,
    a source of vacuum, a vacuum channel in said cover and connected to said expansion chamber, and
    connection means connecting said source of vacuum with said vacuum channel and said outlet opening,
    whereby liquids pass from said inlet channel to said outlet channel only when said source of vacuum is operating.

2. A vacuum actuated sheath valve as set forth in claim 1 in which said connection means is a manifold having a plenum chamber therein, said plenum chamber being connected to said source of vacuum, said vacuum channel, and said outlet opening.

3. A vacuum actuated sheath valve as set forth in claim 1 in which said source of vacuum is a Venturi aspirator.

4. A vacuum actuated sheath valve as set forth in claim 3 in which said Venturi aspirator is operated by gaseous fluid.

5. A vacuum actuated sheath valve as set forth in claim 3 in which said Venturi aspirator is operated by liquid.

6. A vacuum actuated sheath valve as set forth in claim 1 in which said source of vacuum is a vacuum pump.

7. A vacuum actuated sheath valve as set forth in claim 1 in which said sheath valve is a linear sheath valve.

8. A vacuum actuated sheath valve as set forth in claim 1 including a plurality of said outlet channels.

9. A vacuum actuated sheath valve as set forth in claim 1 including a plurality of said inlet channels.

10. In a liquid/paste dispensing system, said system including a dispensing container, a receiver for dispensed materials, and a vacuum source, that improvement including
    a valve platform, said valve platform having a convex surface,
    an inlet channel and an outlet channel in said valve platform, said channels leading to an inlet opening and an outlet opening, respectively, on said convex surface, said openings being spaced from one another,
    a cover for said convex surface of said valve platform, said cover having a concave surface complementary to said convex surface, said concave surface including an expansion chamber,
    an elastomeric membrane positioned between said valve platform and said cover, tension means for holding said elastomeric membrane under tension with said elastomeric membrane taut against said convex surface and over said inlet opening and said outlet opening,
    a vacuum channel in said cover and connected to said expansion chamber, and
    connection means connecting said vacuum source with said vacuum channel and said outlet opening,
    whereby liquids/pastes pass from said inlet channel to said outlet channel only when said vacuum source is operating.

11. In a liquid/paste dispensing system as set forth in claim 10, that improvement in which said connection means is a manifold having a plenum chamber therein, said plenum chamber being connected to said source of vacuum, said vacuum channel, and said outlet opening.

12. In a liquid/paste dispensing system as set forth in claim 10, that improvement including a plurality of said outlet channels.

13. In a liquid/paste dispensing system as set forth in claim 10, that improvement including a plurality of said inlet channels.

14. A one-way valve structure including a base having a surface thereon, at least one inlet channel and one outlet channel leading through said base to said surface
    an elastic membrane held in tension against said surface, said membrane being distended when held in said tension against said surface, causing said membrane to seal said channels,
    a plenum chamber over said membrane on the side of said membrane removed from said base, and
    a source of reduced pressure connected to said plenum chamber,
    whereby, upon application of said reduced pressure, said membrane will be lifted from said surface, thereby opening said channels and permitting an interconnection between said channels.

15. A one-way valve structure as set forth in claim 14 including means connecting said source of reduced pressure with said outlet channel.

16. A vacuum actuated sheath valve as set forth in claim 2 in which said elastomeric membrane has a plenum side facing said plenum and a channel side facing said outlet channel, the exposed area on said plenum side being greater than the exposed area on said channel side when said valve is in closed position.

17. In a liquid/paste dispensing system as set forth in claim 11, that improvement in which said elastomeric membrane has a plenum side facing said plenum and a channel side facing said outlet channel, the exposed area on said plenum side being greater than the exposed area on said channel side when said valve is in closed position.

* * * * *